(12) United States Patent
Ueda et al.

(10) Patent No.: US 9,382,363 B2
(45) Date of Patent: Jul. 5, 2016

(54) MASONRY-TREATING AGENT

(75) Inventors: Akihiko Ueda, Settsu (JP); Masahiko Maeda, Settsu (JP); Teruyuki Fukuda, Settsu (JP); Tetsuya Masutani, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1220 days.

(21) Appl. No.: 12/973,106

(22) Filed: Dec. 20, 2010

(65) Prior Publication Data

US 2011/0086971 A1    Apr. 14, 2011

Related U.S. Application Data

(62) Division of application No. 10/559,810, filed as application No. PCT/JP2004/008243 on Jun. 7, 2004, now abandoned.

(30) Foreign Application Priority Data

Jun. 9, 2003    (JP) .................................. 2003-163462

(51) Int. Cl.
  C09D 127/12    (2006.01)
  B05D 3/00    (2006.01)
  C08F 220/24    (2006.01)
  C04B 41/48    (2006.01)

(52) U.S. Cl.
  CPC ........... C08F 220/24 (2013.01); C04B 41/4842 (2013.01)

(58) Field of Classification Search
  USPC .................................. 524/544; 427/331, 344
  See application file for complete search history.

(56) References Cited

U.S. PATENT DOCUMENTS

| | | | | |
|---|---|---|---|---|
| 4,366,300 A | * | 12/1982 | Delescluse | C08L 33/14 106/10 |
| 4,592,930 A | | 6/1986 | Schmidt et al. | |
| 5,021,316 A | * | 6/1991 | Kubo | G03G 9/1134 428/407 |
| 5,021,501 A | * | 6/1991 | Ohmori et al. | 524/544 |
| 5,069,941 A | | 12/1991 | Ohmori et al. | |
| 5,071,725 A | * | 12/1991 | Kubo | G03G 9/1134 428/407 |
| 5,128,389 A | * | 7/1992 | Inukai | C09D 4/00 522/172 |
| 2001/0002416 A1 | | 5/2001 | Matakawa et al. | |

FOREIGN PATENT DOCUMENTS

| | | |
|---|---|---|
| CN | 1400260 A | 3/2005 |
| EP | 0 247 489 A2 | 12/1987 |
| EP | 247489 A2 * | 12/1987 |
| EP | 0 327 906 A1 | 8/1989 |
| EP | 327906 A1 * | 8/1989 |
| EP | 0 333 083 A2 | 9/1989 |
| EP | 1 225 187 A1 | 7/2002 |
| EP | 1 568 721 A1 | 8/2005 |
| EP | 1 743 910 A1 | 1/2007 |
| EP | 1743910 A1 * | 1/2007 |
| FR | 2 762 000 A1 | 10/1998 |
| GB | 2 077 274 A | 12/1981 |
| JP | 57-23662 A | 2/1982 |
| JP | 63-90588 A | 4/1988 |
| JP | 63-99285 A | 4/1988 |
| JP | 1-315471 A | 12/1989 |
| JP | 05-017538 * | 1/1993 |
| JP | 05-017538 A | 1/1993 |
| JP | 7-109317 A | 4/1995 |
| JP | 11-77677 A | 3/1999 |
| JP | 11-124419 * | 5/1999 |
| JP | 11-507687 A | 7/1999 |
| JP | 2000-264757 A | 9/2000 |
| JP | 2002-105433 * | 4/2002 |
| JP | 2003-154307 * | 5/2003 |
| JP | 2003-154307 A | 5/2003 |
| WO | 97/00230 A1 | 1/1997 |
| WO | 02/40557 A1 | 5/2002 |
| WO | 2005/097850 A1 | 10/2005 |
| WO | WO-2005/097850 A1 * | 10/2005 |

OTHER PUBLICATIONS

U.S. Environmental Protection Agency. Office of Pollution Prevention and Toxics. Risk Assessment Division, Preliminary Risk Assessment of the Developmental Toxicity Associated With Exposure to Perfluorooctanoic Acid and Its Salts, Apr. 10, 2003, pp. 1-61, http://www.epa.gov/opptintr/pfoa/pfoara.pdf.

U.S. Environmental Protection Agency, "Perfluorooctanoic Acid (PFOA), Fluorinated Telomers; Request for Comment, Solicitation of Interested Parties for Enforceable Consent Agreement Development, and Notice of Public Meeting", Federal Register, vol. 68, No. 73, Wednesday, Apr. 16, 2003/Notices, pp. 18626-18633, [FRL-7303-8]., http://www.epa.gov/opptintr/pfoa/pfoafr.pdf.

U.S. Environmental Protection Agency, "EPA Intensifies Scientific Investigation of a Chemical Processing Aid", EPA Environmental News, Monday Apr. 2003, pp. 1-2, http://www.epa.gov/opptintr/pfoa/pfoaprs.pdf.

U.S. Environmental Protection Agency, "EPA Oppt Fact Sheet", Apr. 14, 2003, 3 pages , http://www.epa.gov/opptintr/pfoa/pfoafacts.pdf.

* cited by examiner

*Primary Examiner* — Peter D Mulcahy
*Assistant Examiner* — Henry Hu
(74) *Attorney, Agent, or Firm* — Sughrue Mion, PLLC

(57) ABSTRACT

A fluoropolymer for masonry treatment produced from (A) a fluoromonomer which has been substituted in the α-position by a X group and is represented by the formula (I):

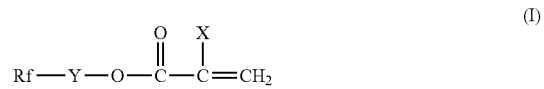

and (B) a monomer having a functional group reactive with active hydrogen. It imparts excellent water- and oil-repellency and unsusceptibility to fouling to masonries.

6 Claims, No Drawings

MASONRY-TREATING AGENT

This application is a Rule 53(b) Divisional of U.S. application Ser. No. 10/559,810 filed May 12, 2006, which is a 371 of PCT Application No. PCT/JP2004/008243 filed Jun. 7, 2004, which claims benefit of Japanese Patent Application No. P2003-163462 filed Jun. 9, 2003. The above-noted applications are incorporated herein by reference in their entirety.

TECHNICAL FIELD

The present invention relates to a fluorine-containing polymer for treating a masonry and a composition for treating a masonry.

BACKGROUND ARTS

It is studied that water and oil repellency and soil resistance are imparted by treating a surface of a masonry such as stone with a compound having a fluoroalkyl group (Rf group).

For example, JP-A-57-23662 describes that an acrylate having a Rf group is coated on a concrete and a stone to form a protective film. JP-A-07-109317 discloses a treatment agent comprising a fluorine-containing copolymer comprising a monomer having a Rf group, and a silicone-based vinyl monomer. JP-A-11-507687 discloses a masonry-treatment agent comprising a water-soluble polymer having a Rf group, a carboxyl group, an oxyalkylene group and a silyl group. EP1225187 discloses the treatment of ceramics with a polymer having a silyl group which comprises a Rf group-containing monomer, a fluorine-free monomer and a silyl group-containing monomer. Further, JP-A-11-077677 proposes that a stone is treated with a phosphate ester having a Rf group.

These treatments or these treatment agents, however, do not have both of sufficient water repellency and sufficient oil repellency, and cannot impart sufficient soil resistance for a masonry-treatment agent.

On the other hand, a water- and oil-repellent agent and a soil resist agent, comprising a polymer containing a fluorine-containing acrylate substituted at its α-position by a fluorine atom, chlorine atom or the like are disclosed in, for example, JP-A-63-90588, JP-A-63-99285 and JP-A-1-315471. However, these have not been practically used as a masonry-treatment agent.

Described below are the environmental problems raised by perfluorooctanoic acid (PFOA). The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS"(http://www.epa.gov/opptintr/pfoa/pfoara.pdf)] have taught that PFOA (perfluorooctanoic acid), one of long chain fluoroalkyl compounds, is proved to have a danger to burden the environment. Under such a situation, EPA announced on Apr. 14, 2003 that the scientific investigation on PFOA should be more intensively executed.

On the other hand, the Federal Register (FR Vol. 68, No. 73/Apr. 16, 2003 [FRL-7303-8], http://www.epa.gov/opptintr/pfoa/pfoafr.pdf), EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf) and EPA OPPT FACT SHEET Apr. 14, 2003 (http://www.epa.gov/opptintr/pfoa/pfoafacts.pdf) have published that telomers have a possibility to produce PFOA when decomposed or metabolized (herein, the telomer means a long chain fluoroalkyl group), and also that telomers have been widely used in foam fire extinguishers, care products, washing materials, carpets, textiles, paper, leather, etc., in order to impart water and oil repellency and soil resistance to them.

DISCLOSURE OF INVENTION

One of objects of the present invention is to provide a treatment agent which imparts both of excellent water- and oil-repellency and excellent soil resistance to a masonry.

The present invention provides a fluorine-containing polymer for masonry treatment, comprising:
(A) repeating units derived from a fluorine-containing monomer of the formula:

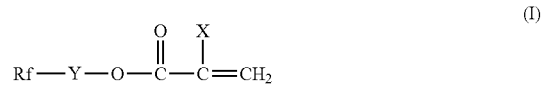

(I)

wherein X is a fluorine atom, a chlorine atom, a bromine atom, an iodine atom, a $CFX^1X^2$ group (in which $X^1$ and $X^2$ are each a hydrogen atom, a fluorine atom, a chlorine atom, a bromine atom or an iodine atom), a cyano group, a linear or branched fluoroalkyl group having 1 to 20 carbon atoms, a substituted or unsubstituted benzyl group, or a substituted or unsubstituted phenyl group;

Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and Rf is a linear or branched fluoroalkyl or fluoroalkenyl group having 1 to 21 carbon atoms, or a fluoroether group having totally 1 to 200 repeating units selected from the group consisting of the repeating units: —$C_3F_6O$—, —$C_2F_4O$— and —$CF_2O$—, and (B) repeating units derived from a monomer having a functional group reactive with active hydrogen.

That is, the present invention provides a fluorine-containing polymer for masonry treatment, comprising:
(A) a fluorine-containing monomer of the formula (I) which is substituted at the α-position with a X group, and
(B) a monomer having a functional group reactive with active hydrogen.

The present invention provides also a composition for treating a masonry, which comprises the fluorine-containing polymer comprising (A) the fluorine-containing monomer of the formula (I) and (B) the monomer having a functional group reactive with active hydrogen, and a solvent.

The present invention further provides a method of producing a treated masonry, which comprises applying said composition to a surface of a masonry, and then eliminating the organic solvent.

The repeating units (A) are derived from the fluorine-containing monomer of the formula (I).

When the Rf group in the formula (I) is a fluoroalkyl group or a fluoroalkenyl group, the Rf group is preferably a perfluoroalkyl group or a perfluoroalkenyl group. The fluoroalkyl group or the fluoroalkenyl group has 1 to 21 carbon atoms, particularly 1 to 6 carbon atoms, for example, 1 to 4 carbon atoms. Examples of the fluoroalkyl group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF$ $-(CF_3)_2$, $-CF_2C(CF_3)_3$, $-CF(CF_3)CF_2CF_2CF_3$, $-(CF_2)_5CF_3$, $-(CF_2)_3CF(CF_3)_2$, $-(CF_2)_4CF(CF_3)_2$, $-(CF_2)_7CF_3$, $-(CF_2)_5CF(CF_3)_2$, $-(CF_2)_6CF(CF_3)_2$, and $-(CF_2)_9CF_3$.

Y is an aliphatic group having 1 to 10 carbon atoms, an aromatic group or a cycloaliphatic group, each having 6 to 10 carbon atoms, a group $-CH_2CH_2N(R^1)SO_2-$ group (in which $R^1$ is an alkyl group having 1 to 4 carbon atoms) or a $-CH_2CH(OY^1)CH_2-$ group (in which $Y^1$ is a hydrogen atom or an acetyl group). The aliphatic group is preferably an alkylene group, particularly having 1 to 4 carbon atoms, for example, 1 or 2 carbon atoms. The aromatic group and the cycloaliphatic group may be substituted or unsubstituted.

The fluoroether group has at least one repeating unit (an oxyperfluoroalkylene group) selected from the group consisting of the repeating units: $-C_3F_6O-$, $-C_2F_4O-$ and $-CF_2O-$. The $-C_3F_6O-$ group is $-CF_2CF_2CF_2O-$ or $-CF_2C(CF_3)FO-$. The $-C_2F_4O-$ group is generally $-CF_2CF_2O-$. The total number of the oxyperfluoroalkylene repeating units is 1 to 200, for example, 1 to 100, and particularly 5 to 50. The fluoroether group has a terminal group which is directly bonded to the oxyperfluoroalkylene repeating unit. Examples of the terminal group include a hydrogen atom, a halogen atom (e.g., a fluorine atom), an alcohol group (e.g., $HOCH_2-$), an epoxy group (for example,

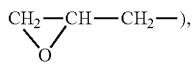

an amine group (e.g., $H_2N-$), a carboxylic acid group (e.g., $HOOC-$), an acid halide group (e.g., $F(O=)C-$) and a chloromethyl group ($ClH_2C-$). The fluoroether group may have a fluoroalkylene group having 1 to 10 carbon atoms, particularly a perfluoroalkylene group, in addition to the oxyperfluoroalkylene repeating unit and the terminal group. Examples of the fluoroalkylene group having 1 to 10 carbon atoms are $-CF_2-$ and $-CF_2CF_2-$.

Examples of the fluoroether group (particularly, a perfluoroether group) which is an example of the Rf group include the followings:

F—$(CF_2CF_2CF_2O)_n$—$CF_2CF_2-$ (n is a number of 1 to 200),

F—$(CF_2C(CF_3)FO)_n$—$CF_2CF_2-$ (n is a number of 1 to 200),

F—$(CF_2C(CF_3)FO)_n$—$(CF_2O)_m$—$CF_2CF_2-$ (the total of n and m is 1 to 200), and F—$(CF_2CF_2O)_n$—$(CF_2O)_m$—$CF_2CF_2-$ (the total of n and m is 1 to 200).

Examples of the fluorine-containing monomer include the followings:

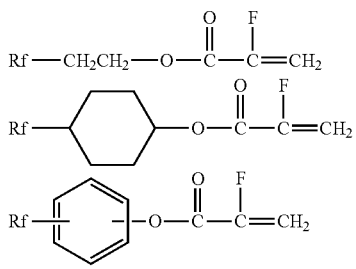

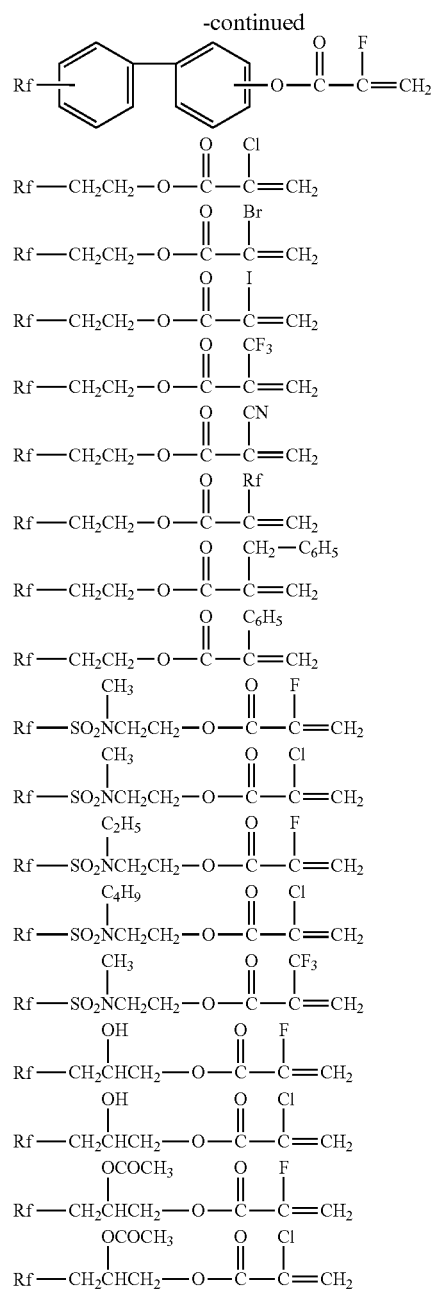

wherein Rf is a linear or branched fluoroalkyl or fluoroalkenyl group having 1 to 21 carbon atoms, or a fluoroether group having totally 1 to 200 repeating units selected from the group consisting of the repeating units: $-C_3F_6O-$, $-C_2F_4O-$ and $-CF_2O-$.

In the monomer having a functional group reactive with hydrogen atom (B), examples of the functional group reactive with hydrogen atom includes a silane group, a phosphate group (or a phosphoric acid group), a carboxylate group (a carboxylic acid group), a sulfonate group (or a sulfonic acid group) and a glycidyl group.

The monomer (B) is preferably a compound having a carbon-carbon double bond and a functional group reactive with active hydrogen.

A monomer having the silane group is preferably a compound having a silane group (particularly a terminal silane group) and a carbon-carbon double bond. The monomer having the silane group may be a terminal silane coupling agent.

Specific examples of the silane group-containing monomer are as follows:

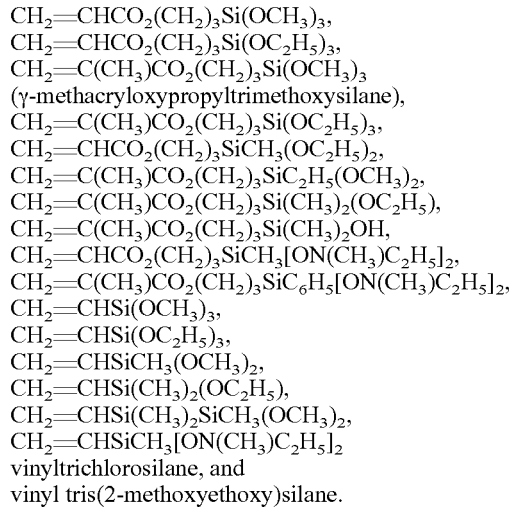

$CH_2=CHCO_2(CH_2)_3Si(OCH_3)_3$,
$CH_2=CHCO_2(CH_2)_3Si(OC_2H_5)_3$,
$CH_2=C(CH_3)CO_2(CH_2)_3Si(OCH_3)_3$
(γ-methacryloxypropyltrimethoxysilane),
$CH_2=C(CH_3)CO_2(CH_2)_3Si(OC_2H_5)_3$,
$CH_2=CHCO_2(CH_2)_3SiCH_3(OC_2H_5)_2$,
$CH_2=C(CH_3)CO_2(CH_2)_3SiC_2H_5(OCH_3)_2$,
$CH_2=C(CH_3)CO_2(CH_2)_3Si(CH_3)_2(OC_2H_5)$,
$CH_2=C(CH_3)CO_2(CH_2)_3Si(CH_3)_2OH$,
$CH_2=CHCO_2(CH_2)_3SiCH_3[ON(CH_3)C_2H_5]_2$,
$CH_2=C(CH_3)CO_2(CH_2)_3SiC_6H_5[ON(CH_3)C_2H_5]_2$,
$CH_2=CHSi(OCH_3)_3$,
$CH_2=CHSi(OC_2H_5)_3$,
$CH_2=CHSiCH_3(OCH_3)_2$,
$CH_2=CHSi(CH_3)_2(OC_2H_5)$,
$CH_2=CHSi(CH_3)_2SiCH_3(OCH_3)_2$,
$CH_2=CHSiCH_3[ON(CH_3)C_2H_5]_2$
vinyltrichlorosilane, and
vinyl tris(2-methoxyethoxy)silane.

Specific examples of a monomer having the phosphate group include 2-methacryloyloxyethyl acid phosphate, 2-acryloyloxyethyl acid phosphate, acid phosphoxypropyl methacrylate, 3-chloro-2-acid phosphoxypropyl methacrylate, and 2-methacryloyloxyethyl acid phosphate monoethanolamine half salt.

Specific examples of a monomer having the carboxylate group include methacrylic acid, acrylic acid, 2-methacryloyloxyethyl succinic acid, 2-acryloyloxyethyl succinic acid, 2-methacryloyloxyethyl phthalate, 2-acryloyloxyethyl phthalate, 2-methacryloyloxyethyl hexahydrophthalate, 2-acryloyloxyethyl hexahydrophthalate, 2-acryloyloxypropyl phthalate, 2-acryloyloxypropyl hexahydrophthalate, 2-acryloyloxypropyl tetrahydrophthalate, maleic anhydride and citraconic anhydride.

Specific examples of a monomer having the sulfonate group include acrylamide-tert.-butyl sulfonic acid, and 2-acrylamide-2-methylpropane sulfonic acid.

Specific examples of a monomer having the glycidyl group include glycidyl methacrylate and glycidyl acrylate.

The amount of the monomer having a functional group reactive with hydrogen atom (B) may be from 0.01 parts to 50 parts by weight, from 0.1 parts to 20 parts by weight, based on 100 parts by weight of the fluorine-containing monomer (A).

The fluorine-containing polymer may contain (C) an other monomer, in addition to the fluorine-containing monomer (A) and the monomer having a functional group (B). The other monomer (C) may be a fluorine-free monomer. The fluorine-free monomer may be an alkyl group-containing monomer.

The fluorine-free monomer may be a fluorine-free alkyl (meth)acrylate.

The fluorine-free alkyl (meth)acrylate is generally a monomer of the formula:

$$X^1-CX^2=CH_2 \qquad (i)$$

wherein $X^1$ is an alkyl carboxylate group (the number of carbon atoms in the alkyl group: 1 to 18), and $X^2$ is a hydrogen atom or a methyl group. The fluorine-containing polymer may not contain the fluorine-free alkyl (meth)acrylate.

The fluorine-containing polymer may contain the other monomer other than the fluorine-free alkyl (meth)acrylate. Examples of the other monomer are Rf group-free monomers such as ethylene, vinyl halide (for example, vinyl chloride), vinylidene halide (for example, vinylidene chloride), styrene, vinyl alkyl ketone, isoprene, chloroprene, butadiene, benzyl (meth)acrylate, 2-hydroxyethyl (meth)acrylate, 2-hydroxypropyl (meth)acrylate, glycerol mono(meth)acrylate, methoxypolyethyleneglycol (meth)acrylate, polypropyleneglycol (meth)acrylate, tetrahydrofurfuryl (meth)acrylate, dimethylamino (meth)acrylate, trimethyl-(2-hydroxy-3-methacryloyloxypropyl) ammonium chloride and 3-chloro-2-hydroxypropyl methacrylate.

The amount of the other monomer may be from 0 to 100 parts by weight, for example, from 0 to 90 parts by weight; particularly from 1 to 70 parts by weight, based on 100 parts by weight of the fluorine-containing monomer (A).

The fluorine-containing polymer can be prepared by any of conventional polymerization methods. The conditions of polymerization reaction can be arbitrarily selected. The polymerization procedure includes a bulk polymerization, a solution polymerization and an emulsion polymerization. The solution polymerization is generally preferable.

The molecular weight of the fluorine-containing polymer may be generally from 5,000 to 1,000,000 (for example, measured in GPC and in terms of polystyrene).

The treatment agent is in the form of a solution wherein the fluorine-containing polymer is dissolved in an organic solvent. The organic solvent may be an alcohol, an ester, a ketone, a halogenated hydrocarbon, or a petroleum organic solvent.

In the treatment agent comprising the fluorine-containing polymer and the organic solvent, the concentration of the fluorine-containing polymer may be, for example, from 0.1 to 50% by weight.

The treatment agent may contain an antifreezing agent, a viscosity-adjusting agent, an ultraviolet absorbing agent, an antioxidant, a pH adjuster, a defoaming agent, an antiseptic agent, a flame retardant, etc. according to necessity.

In the present invention, the treatment agent is applied to a substrate (masonry) to impart the water- and oil-repellency and the soil resistance to the substrate.

The substrate is masonry such as stone. Examples of the masonry include stone, brick, concrete and tile. Examples of stone include natural stone (for example, marble and granite), and artificial stone.

A method of treating the substrate is as follows. The treatment agent is applied to the substrate. The application can be can be performed by coating, dipping, brushing, etc. Then, the organic solvent is removed. The removal of the organic solvent can be performed by, for example, the drying. The drying can be performed at a temperature of, for example, 0° C. to 200° C.

The application amount of the fluorine-containing polymer may be 0.05 to 50 g, for example, 0.1 to 20 g, especially 1 to 10 g, per 1 $m^2$ of the surface area of the masonry.

The treatment agent can give the water-repellent oil-repellent performance to the masonry surface, since the treatment agent contains the fluorine-containing polymer. The adhesion of a soil to masonry can be prevented, even if the soil is an aqueous soil or is an oily soil.

PREFERABLE EMBODIMENTS OF THE INVENTION

Although Examples of this invention are described below, these are only examples of this invention and this invention is not limited thereto. Hereinafter % is % by weight, unless specified.

In the following Examples and Comparative Examples, a soil resistance test was conducted as follows:

A soil was put on a treated substrate, and droplets were left for 24 hours and wiped off with a paper towel. The evaluation was conducted according to the following criteria.
1: Deep stain, and broad oil droplet spread
2: Deep stain, and slight or no oil droplet spread
3: Medium stain, and no spread
4: Slight stain
5: No stain.

EXAMPLE 1

Into a 200 cc four-necked flask equipped with a stirrer, an inert gas inlet, a condenser and a thermometer, 13.0 g of $CF_3CF_2CF_2CF_2CH_2CH_2OCOCCl=CH_2$, 6.5 g of stearyl acrylate, 0.5 g of γ-methacryloxypropyltrimethoxysilane (SZ6030 manufactured by Dow Corning Toray Co., Ltd.) and 113.3 g of tetrachlorohexafluorobutane (S-316 manufactured by Daikin Industries, Ltd.) were charged and heated to 60° C. A solution of t-butyl peroxypivalate (1.5 g) (PERBUTYL PV manufactured by NOF Corp.) in trichloroethane (7.3 g) was added and the polymerization reaction was conducted with stirring at 60° C. for at least 12 hours. A gas chromatography revealed that a polymerization reaction conversion was at least 97%. The resultant polymer solution was diluted with butyl acetate to give a treatment liquid having a solid content of 3%.

A surface of each of polished natural granite (mined in China, and purchased from Nittai Kogyo Kabushiki-Kaisha) and limestone (purchased from Inax Corp.) was coated with the treatment liquid (1 mL of the treatment liquid was applied to an area of 5 cm×10 cm). After left at room temperature for 10 minutes, a superfluous treatment liquid was wiped off. After left at room temperature for 24 hours, the soil resistance test was conducted. The results are shown in Table 1 (granite) and Table 2 (limestone).

COMPARATIVE EXAMPLE 1

The polymerization reaction was conducted to give a polymer solution in the same procedure as in Example 1 except that $CF_3CF_2CF_2CF_2CH_2CH_2OCOCCl=CH_2$ was changed to $CF_3CF_2CF_2CF_2CH_2CH_2OCOCH=CH_2$. In the same manner as in Example 1, the polymer solution was diluted with butyl acetate to adjust the solid concentration to 3%, the treatment was conducted and the soil resistance test was conducted. The results are shown in Table 1 and Table 2.

COMPARATIVE EXAMPLE 2

Into a 200 cc four-necked flask equipped with a stirrer, an inert gas inlet, a condenser and a thermometer, 13.0 g of $CF_3CF_2CF_2CF_2CH_2CH_2OCOCCl=CH_2$, 7.0 g of stearyl acrylate and 113.3 g of tetrachlorohexafluorobutane (S-316 manufactured by Daikin Industries, Ltd.) were charged and heated to 60° C. A solution of t-butyl peroxypivalate (1.5 g) (PERBUTYL PV manufactured by NOF Corp.) in trichloroethane (7.3 g) was added and the polymerization reaction was conducted with stirring at 60° C. for at least 12 hours. A gas chromatography revealed that a polymerization reaction conversion was at least 97%. In the same manner as in Example 1, the polymer solution was diluted with butyl acetate to adjust the solid concentration to 3%, the treatment was conducted and the soil resistance test was conducted. The results are shown in Table 1 and Table 2.

EXAMPLE 2

Into a 200 cc four-necked flask equipped with a stirrer, an inert gas inlet, a condenser and a thermometer, 16.8 g of $CF_3CF_2CF_2CF_2CH_2CH_2OCOCCl=CH_2$, 2.7 g of stearyl acrylate, 0.5 g of γ-methacryloxypropyltrimethoxysilane (SZ6030 manufactured by Dow Corning Toray Co., Ltd.) and 60 g of butyl acetate were charged and heated to 70° C. Azobisisobutyronitrile (0.15 g) was added and the polymerization reaction was conducted with stirring at 70° C. for at least 12 hours. A gas chromatography revealed that a polymerization reaction conversion was at least 97%. In the same manner as in Example 1, the polymer solution was diluted with butyl acetate to adjust the solid concentration to 3%, the treatment was conducted and the soil resistance test was conducted. The results are shown in Table 1 and Table 2.

EXAMPLE 3

The polymerization reaction was conducted to give a polymer solution in the same procedure as in Example 1 except that $CF_3CF_2CF_2CF_2CH_2CH_2OCOCCl=CH_2$ was changed to $CF_3CF_2CF_2CF_2CH_2CH_2OCOCF=CH_2$. In the same manner as in Example 1, the polymer solution was diluted with butyl acetate to adjust the solid concentration to 3%, the treatment was conducted and the soil resistance test was conducted. The results are shown in Table 1 and Table 2.

TABLE 1

Soil resistance test (granite)

|  | Olive Oil | Waste oil | Red wine | Coffee |
|---|---|---|---|---|
| Example 1 | 5 | 5 | 4 | 5 |
| Comparative Example 1 | 2 | 2 | 2 | 2 |
| Comparative Example 2 | 3 | 3 | 2 | 3 |
| Untreated | 1 | 1 | 1 | 1 |
| Example 2 | 5 | 5 | 5 | 5 |
| Example 3 | 5 | 4 | 4 | 5 |

TABLE 2

Soil resistance test (limestone)

|  | Olive Oil | Waste oil | Red wine | Coffee |
|---|---|---|---|---|
| Example 1 | 5 | 4 | 4 | 5 |
| Comparative Example 1 | 2 | 2 | 2 | 2 |
| Comparative Example 2 | 3 | 2 | 2 | 3 |
| Untreated | 1 | 1 | 1 | 1 |
| Example 2 | 5 | 5 | 5 | 5 |
| Example 3 | 5 | 4 | 4 | 5 |

EFFECTS OF THE INVENTION

According to the present invention, excellent water- and oil-repellency and stain resistance are imparted to masonries.

The invention claimed is:
1. A method of treating masonry, which comprises applying a composition comprising a fluorine-containing polymer and an organic solvent to a surface of a masonry, and then eliminating the organic solvent, wherein the fluorine-containing polymer, comprises:

(A) repeating units derived from a fluorine-containing monomer of the formula:

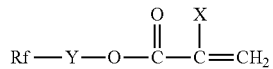

wherein X is a chlorine atom;

Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and Rf is a linear or branched perfluoroalkyl or perfluoroalkenyl group having 1 to 6 carbon atoms, and (B) repeating units derived from a monomer having a functional group reactive with active hydrogen, wherein the monomer having a functional group reactive with active hydrogen is a silane compound having a carbon-carbon double bond.

2. The method according to claim 1, wherein the fluorine-containing polymer further comprises (C) repeating units derived from a fluorine-free alkyl group-containing monomer, wherein the fluorine-free alkyl group-containing monomer is an alkyl (meth)acrylate.

3. The method according to claim 2, wherein the fluorine-containing polymer consists essentially of the repeating units (A), (B) and (C).

4. The method according to claim 1, wherein the amount of the repeating units (B) is 0.01 parts to 50 parts by weight, based on 100 parts by weight of the repeating units (A).

5. The method according to claim 1, wherein the fluorine-containing polymer consists essentially of the repeating units (A) and (B).

6. A masonry produced by the method according to claim 1.

* * * * *